United States Patent [19]
Weber

[11] 4,028,596
[45] * June 7, 1977

[54] CORONA POWER SUPPLY CIRCUIT

[75] Inventor: Harold J. Weber, Sherborn, Mass.

[73] Assignee: Coulter Information Systems, Inc., Bedford, Mass.

[ * ] Notice: The portion of the term of this patent subsequent to Oct. 12, 1993, has been disclaimed.

[22] Filed: Oct. 20, 1975

[21] Appl. No.: 623,903

Related U.S. Application Data

[63] Continuation-in-part of Ser. No. 532,713, Dec. 12, 1974, abandoned, which is a continuation-in-part of Ser. No. 378,136, July 11, 1973, abandoned.

[52] U.S. Cl. .................................. 361/235; 321/2; 321/15
[51] Int. Cl.² ...................................... G03G 15/00
[58] Field of Search .......... 317/3, 4, 262 R, 262 A; 321/2 R, 2 HF, 15; 331/113 R; 250/324–326; 323/DIG. 1

[56] References Cited

UNITED STATES PATENTS

| | | | |
|---|---|---|---|
| 2,965,755 | 12/1960 | West | 317/262 A |
| 2,985,812 | 5/1961 | Peterson | 321/15 |
| 3,280,368 | 10/1966 | Ahmed et al. | 317/DIG. 6 |
| 3,287,614 | 11/1966 | Sowiak | 317/262 A |
| 3,355,639 | 11/1967 | Semenhuk | 321/15 |
| 3,493,840 | 2/1970 | Rosenberg | 321/15 |
| 3,567,996 | 3/1971 | Gordon et al. | 317/3 |
| 3,815,354 | 6/1974 | Strocka et al. | 323/DIG. 1 |
| 3,819,942 | 6/1974 | Hastwell et al. | 317/262 A |
| 3,908,164 | 9/1975 | Parker | 317/262 A |

OTHER PUBLICATIONS

RCA Application Note ICAN–6267, "Digital Integrated Circuits," 3/71, pp. 353–360.

Primary Examiner—Harry E. Moose, Jr.
Attorney, Agent, or Firm—Silverman & Cass, Ltd.

[57] ABSTRACT

A portable power supply circuit for supplying a high voltage corona in a portable electrophotographic apparatus. An A.C. signal comprising a series of pulses is produced by an oscillating circuit. The pulses are shaped by a shaping circuit which draws current during only a portion of the operating cycle. These pulses are coupled through a step-up transformer to a multiplying circuit which multiplies the voltage at its input to the desired corona voltage. A control circuit senses the desired corona voltage and operates to inhibit passage of oscillations from the oscillating circuit to the pulse shaping circuit in order to minimize power consumption.

25 Claims, 1 Drawing Figure

U.S. Patent
June 7, 1977
4,028,596
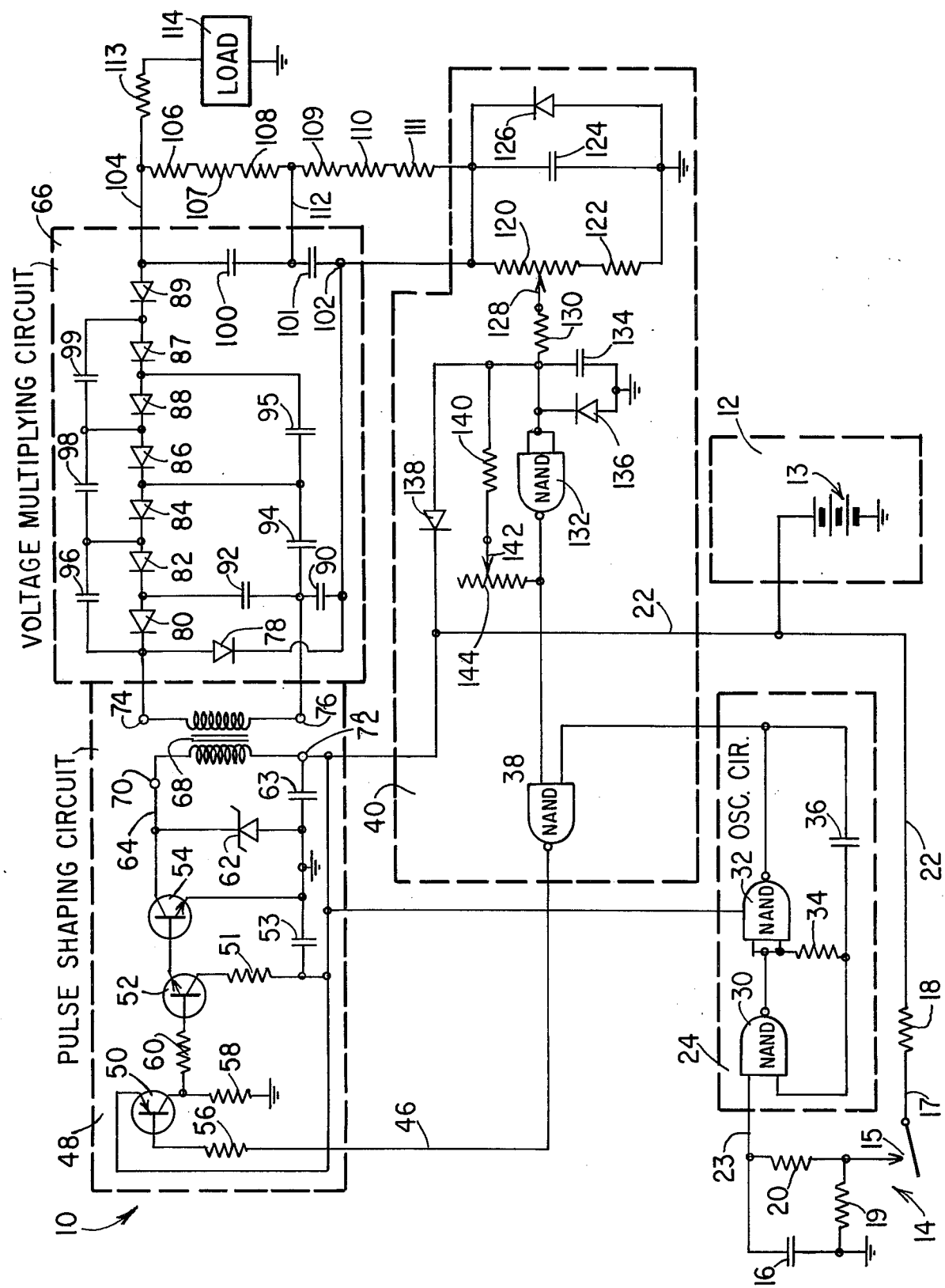

CORONA POWER SUPPLY CIRCUIT

CROSS-REFERENCE TO RELATED APPLICATIONS

This application is a Continuation-in-Part of my patent application Ser. No. 532,713 filed Dec. 12, 1974, now abandoned, which is a Continuation-in-Part of my patent application Ser. No. 378,126 filed July 11, 1973 and now abandoned. Both patent applications noted are assigned to the assignee of this application.

Reference is made herein to copending patent application Ser. No. 260,848, filed June 8, 1972, entitled "ELECTROPHOTOGRAPHIC FILM AND METHOD OF MAKING AND USING THE SAME"; and to copending patent application, Ser. No. 323,108 filed Jan. 12, 1973, entitled "METHOD AND APPARATUS FOR PROCESSING ELECTROSTATIC IMAGES," all of said copending applications being assigned to the assignee of this application.

BACKGROUND OF THE INVENTION

This invention relates to power supply circuits for use in portable electrophotographic apparatus and more particularly, to a portable, modular corona power supply circuit of the high-voltage low-current type for use in such apparatus.

In the field of xerographic or electrostatic image recording, a latent image is formed on a plate having a photoconductive surface. This latent image is the pattern which is projected onto the plate by a lens system or other suitable means. Prior to projection, the plate is subjected to a corona discharge to provide a large number of electrons at or near the photo-conductive surface which are capable of migrating when bombarded by photons.

An apparatus for processing images utilizing electrophotographic film is described in detail in the copending applications. The electrophototgraphic film is comprised of a substrate of polyester or the like carrying an ohmic layer bonded thereto and an inorganic photoconductive coating bonded to the surface of the ohmic layer. The film is exposed to a corona discharge which is formed when an electrode is subjected to a voltage on the order of six thousand volts; the electrode being adjacent the film.

The corona discharge results in a charge of electrons on or near the surface of the photoconductive coating; exposure to a light pattern causes a patterned discharge of the electrons to produce a latent image; the application of toner particles to the surface results in a variegated adherence of particles. Thus, a visible image is formed by the patterned adhesion of toner particles to the surface of the photoconductor.

Given the necessity of building a small handheld camera type of device for producing the electrostatic record, a small low power consumption power supply circuit of the type capable of supplying corona voltages also would be required. Such prior art supplies were complex, bulky, expensive and not easily adaptable for portable use as would be required in a camera of the above type. So far as known, prior corona voltage circuits continuously were connected to the power source, making them difficult to use with low energy sources, such as for example dry cell batteries. Those which may not have been continuously connected employed oscillator power supplies which made no attempt at minimizing current drain or power consumption.

Prior art power supply circuits overstressed the active elements within the power supply causing component failure and/or break down or "run away" of the circuit when the corona load at the output of the power supply varied from a load to a "no load" condition.

SUMMARY OF THE INVENTION

In practicing this invention, a power supply circuit is provided which operates from a portable source of D.C. voltage. An oscillating circuit coupled to said source of D.C. voltage develops an A.C. signal comprised of a series of pulses when energized. A pulse shaping circuit is provided for shaping said series of pulses and supplying the shaped series of pulses to the voltage multiplying circuit through a transformer. The pulse shaping circuit draws operating current from the source of voltage only during the presence of each pulse. The multiplying circuit multiplies the voltage induced in the transformer to develop the corona voltage and draws no power from the source of D.C. voltage. A control circuit senses the desired corona current and operates to inhibit passage of pulses to the pulse shaping circuit so that no current is drawn by the pulse shaping circuit after the desired corona current is developed.

BRIEF DESCRIPTION OF THE DRAWING

The single FIGURE is a schematic diagram of a corona power supply circuit embodying the features of this invention.

DETAILED DESCRIPTION OF THE PREFERRED EMBODIMENT

The power supply circuit in the single FIGURE is generally designated by the reference numeral 10. A power source 12 includes a battery 13. A switching circuit for energizing the power supply circuit is generally indicated at 14 and comprises an initiate switch 15, a capacitor 16 and resistors 18, 19 and 20. The power source 12 is coupled via conductor 22 and resistor 18 to one contact terminal of the initiate switch 15 at junction 17. Resistor 19 is connected between switch 15 and ground potential. Resistor 20 has one terminal connected to switch 15, and the other terminal connected to a terminal of capacitor 16. The second terminal of capacitor 16 is connected to ground potential.

The junction of capacitor 16 and resistor 20, which is the output of switching circuit 14 is connected to an oscillating circuit 24 by conductor 23. Oscillating circuit 24 is a complimentary metal oxide semi-conductor (C-MOS) integrated circuit chip comprised of four NAND logic gates. Each of the NAND gates has first and second inputs and an output. All four NAND gates operate in the following manner. When a high or positive voltage appears at both inputs to a NAND gate, the output of the gate is a low state signal. For all other combinations of high and low state signals at the input to the NAND gate the output thereof will be a high state signal.

As previously noted the output of switching circuit 14 is coupled to oscillating circuit 24 by conductor 23. Conductor 23 is coupled to a first input of NAND gate 30. The output of NAND gate 30 is coupled to the two joined inputs of NAND gate 32 and to one terminal of resistor 34. The second terminal of resistor 34 is connected to the second input of NAND gate 30 and to one terminal of capacitor 36. The second terminal of capacitor 36 is connected to the output of NAND gate 32, which is also the output of oscillating circuit 24. NAND gates 30 and 32, resistor 34 and capacitor 36 form a particular type of oscillating circuit known as an astable multivibrator.

Prior to closing switch 15 the first input to NAND gate 30 is coupled to ground potential through resistors 19 and 20 so that a ground or low state signal appears at the first input of NAND gate 30. When a low state signal appears at the first input of gate 30, the astable formed by gates 30 and 32 is held in a stable or inoperative state with the output of gate 30 maintained in a high state and the output of gate 32 maintained in a low state. When in this mode of operation, no oscillations are produced at the output of gate 30, and NAND gates 30 and 32 draw no current from battery 13.

When switch 15 is closed capacitor 16 and resistor 20 act as a low pass filter to provide contact-bounce noise elimination resulting from operation of switch 15. Resistors 18 and 19 act as a voltage divider and couple a fixed positive voltage or high state signal through resistor 20 to the first input of NAND gate 30. With a high state signal coupled to the second input of gate 30, the output of gate 30 will switch from a high to low state. This causes the output of gate 32 to change to a high state and capacitor 36 to begin reverse charging. The voltage at the junction of capacitor 36 and resistor 34 will decrease toward zero or the low state at a rate determined by the component values of resistor 34 and capacitor 36. When the voltage at this junction reaches a predetermined value, gate 30 and will effectively see a low state signal at its second input. The low state signal input will cause gate 30 to change states and develop a high state signal at its output. The high state signal now coupled to the input of gate 32 will cause its output to change from a high to a low state which causes capacitor 36 to begin charging in the other direction. Now the voltage at the junction of capacitor 36 and resistor 34 begins increasing at a rate determined as noted above. When the voltage at the junction reaches a predetermined valve, gate 30 will effectively see a high state signal at the second input again causing gate 30 to change states and develop a low state signal at its output.

The cycling described will continue as long as switch 15 is closed and the first input to gate 30 remains high, producing osillations at the output of gate 30 in the form of a train of relatively stable and uniform square wave signals which shift between a high and low state. In the preferred embodiment, the oscillation frequency is approximately 5 KHz. Because of the C-MOS construction, relatively little current is drawn by oscillating circuit 24 even when "latched on" and oscillating. It should be noted at this point, however, that the operating frequency of oscillating circuit 24 will vary in accordance with the component values employed. With a 5 KHz oscillation frequency variations as much as ±1 KHz can occur with normal variations in component value. The variations in supply voltage, however, have little effect on the frequency because of the basic operating characteristics of the integrated circuit employed.

The output of oscillating circuit 24 is coupled to a first input of NAND gate 38 in a control circuit 40. NAND gate 38 acts as an inhibiting gate. When a low state signal is present at the second input of gate 38, the output of gate 38 will remain high. When a high state signal is present at the second input of gate 38, the output thereof will switch to a low state in response to a high state signal at the first input and will return to a high state when the first input of gate 38 returns of a low state. As the oscillations developed by oscillating circuit 24 alternate between low state and high state signals on alternate half cycles, they will cause the output of gate 38 to switch responsively between high and low state signals at its output when a high state signal is present at its second input, developing a corresponding oscillation signal at the output of gate 38. The pulses developed are all uniform in shape because oscillating circuit 24 is operating continuously and its pulses are uniform.

Conductor 46 couples the output of gate 38 in control circuit 38 to pulse-shaping circuit 48. Pulse-shaping circuit 48 includes a current limiting resistor 56 coupled to the base electrode of a PNP transistor 50. The emitter of transistor 50 is coupled to the source of power 12 by conductor 22, and the collector electrode of transistor 50 is coupled through resistor 58 to ground potential. The collector of transistor 50 is also coupled through resistor 60 to the base electrode of transistor 52. Current limiting resistor 51 connects the collector of transistor 52 to the source of power 12 and a capacitor 53 is connected from the junction of resistor 51 and power source 12 to ground potential. Transistor 52 is connected in an emitter follower configuration with its emitter connected to the base electrode of transistor 54. The emitter follower configuration of transistor 52 is preferred because it allows transistor 52 to have a lower voltage rating than would be required of transistor 52 if it and transistor 54 were arranged in a Darlington configuration. The emitter of transistor 54 is coupled to ground potential and the collector is connected to the cathode of a high voltage protection zener diode 62, the anode thereof being coupled to the emitter of transistor 54. The collector electrode of transistor 54 also is coupled to the primary of a step-up transformer 68 at 70 via conductor 64. The other terminal 72 of the primary winding is coupled via conductor 22 to the source of power 12 and by AC bypass capacitor 63 to DC ground potential. Transistors 50 and 52 are configured to provide substantial current gain in order to allow passage of substantial current from collector to emitter of transistor 54 when transistors 52 and 54 are turned on.

When no oscillations are developed by oscillating circuit 24 and for one-half of each oscillation cycle when oscillations occur, the output of gate 38 is a high state signal, as previously explained. This high state signal is coupled by conductor 46 and resistor 56 to the base of transistor 50. With supply voltage coupled to the emitter and a high state signal coupled to the base, transistor 50 will be biased to a nonconductive or cutoff state. When transistor 50 is nonconductive, a voltage will not be developed across resistor 58 and transistors 52 and 54 will be nonconductive or off. When transistors 50, 52 and 54 are nonconductive, substantially no current will be drawn by pulse-shaped circuit 48. For the other half of each oscillation cycle when oscillations occur, the output of gate 38 is a low state signal which is coupled by conductor 46 and resistor 56 to the base of transistor 50. This low state signal will act to forward bias transistor 50 causing it to conduct saturation current and develop a voltage across resistor 58. The uniform square shape of the pulses from gate 38 results in a fast and uniform operation of transistor 50.

The fast and uniform operation results in a more efficient operation of transistor 50.

The voltage developed across resistor 58 is coupled through resistor 60 to the base of transistor 52, forward biasing transistors 52 and 54 and rendering them conductive. Capacitor 53 improves the rise time or transistor 52 by decreasing the power supply AC impedance, thus improving the switching speed and operation of transistors 52 and 54. The improved switching speed and operation of transistors 52 and 54, along with the fast and uniform operation of transistor 50 results in a more efficient operation of transistor 52 and particularly a more efficient operation of transistor 54. With transistor 54 conductive, a saturation current will be drawn from battery 13 through the primary of transformer 68 via conductor 22 connected to terminal 72, and from transformer 68 through the collector and emitter of transistor 54 to ground potential via the conductor 64 connected to terminal 70. This saturation current will cause core saturation of transformer 68. As the saturation current is drawn only for one-half of each oscillation cycle, when the oscillations occurs, and they occur for a short fixed period after operation of switch 15, relatively little total current is drawn by pulse-shaping circuit 48 allowing use of a relatively small, low capacity battery. Furthermore, by connecting pulse-shaping circuit 48 directly to a source of supply rather than supplying full operating power from the oscillator, the output developed by power supply circuit 10 will remain constant, notwithstanding substantial variation in the frequency of oscillating circuit 24. The basis for this statement with be explained subsequently. However, it should be noted that this allows much greater tolerance in component values selected resulting in a lower component cost and a lower cost, mass producible power supply.

In the preferred embodiment, transformer 68 has a turns ratio of approximately 50:1 so that the voltage induced across the secondary between terminals 74 and 76 is stepped up from the voltage developed across the primary of transformer 68. Each time a saturation current is passed through the primary winding saturating transformer 68, approximately 1,000 volts is induced across the secondary between terminals 74 and 76. When transistor 54 is cut off on the alternate half of each oscillation cycle and the current through the primary of transformer 68 is terminated, the magnetic field and energy therein developed by saturation of transformer 68 will attempt to maintain itself and will induce an opposite polarity high energy voltage across the secondary between terminals 74 and 76. This will decrease to zero within a predetermined time T, then increase again in the positive direction, oscillating or ringing. The frequency of oscillation of oscillating circuit 24 is selected such that one-half cycle has a period $T_1$ which is less than T. This maximizes the energy transferred from the magnetic field and developed across the secondary both in response to saturation of transformer 68 and cutoff of saturation currents. As long as one-half of each oscillation cycle has a period which is either less than T or long enough to allow substantially maximum energy transfer into the secondary, the over-all efficiency of the power supply will be maintained. This means that the frequency of oscillating circuit 24 can vary greatly within the above defined limits without having any substantial effect on the power supply efficiency.

A voltage-multiplying circuit 66 is coupled to terminals 74 and 76 of the secondary of transformer 68 and comprises eight diodes 78, 80, 82, 84, 86, 87, 88 and 89; and nine capacitors 90, 92, 94, 95, 96 98, 99, 100 and 101. Capacitors 90, 92 and 94 each have one terminal thereof coupled together and to terminal 76. The cathode of diode 80, the anode of diode 78 and one terminal off capacitor 96 are coupled to terminal 74. The anode of diode 80, the cathode of diode 82 and the second terminal of capacitor 92 are coupled together. The second terminal of capacitor 96, one terminal of capacitor 98, the anode of diode 82 and the cathode of diode 84 are coupled together. The anode of diode 84, the cathod of diode 86, the first terminal of capacitor 95 and the second terminal of capacitor 94 are coupled together; and the anode of diode 86, the cathode of the of diode 88, a first terminal of capacitor 99, and the other terminal of capacitor 98 are coupled together. The anode of diode 88, the cathode of diode 87 and the second terminal of capacitor 95 are coupled together, and the anode of diode 87, the cathode of diode 89 and other terminal of capacitor 99 are coupled together. The anode of diode 89 and one terminal of capacitor 100 are connected together and the other terminal of capacitor 100 is coupled to a first terminal of capacitor 101. The second terminal of capacitor 90, the cathode of diode 78 and the second terminal of capacitor 101 are coupled together at a terminal 102. For a discussion of the voltage-miltiplying circuit operation, assume that terminal 102 is coupled to ground potential.

Operation of voltage multiplying circuit is as follows. For purposes of this explanation we will assume a voltage E is induced across the secondary of transformer 68, and that terminal 102 is at ground potential so that when the voltage induced across the secondary is such that terminal 74 is positive and 76 is negative, terminal 74 will be grounded via the path through forward biased diode 78, and capacitor 90 will charge to —E. When the induced voltage across the secondary next reverses, terminal 74 will become positive and 76 negative. The secondary will be in series with the —E change developed across capacitor 90 so that the effective voltage at terminal 74 becomes —2E. This forward biases diode 80 so that capacitor 92 will charge from the secondary. Capacitors 90 and 92 are series connected so that the voltage developed at the junction of diodes 80 and 82 and capacitor 92 will be —2E. With the next voltage reversal across the secondary terminal 74 becomes positive and is again grounded through diode 78 and terminal 76 becomes negative again recharging capacitor 90 to —E. Diode 82 will now be forward biased allowing capacitor 96 to receive charge from capacitors 90 and 92 and charge to —2E. Upon the next voltage reversal terminal 74 will become negative with a voltage of —2E with respect to ground. This will be in series with the 2E charge across capacitor 96. This will forward bias diode 84 allowing capacitor 94 to charge to —4E. When the voltage across the secondary again reverses terminal 74 will become positive and be grounded through diode 78 and terminal 76 will be negative recharging capacitor 90 to —E. This will cause the voltage at the junction of diodes 82 and 84 and capacitors 96 and 98 to decease to —2E; however, the charge on capacitor 94 will will remain at —4E because diode 84 is reverse biased preventing discharge. With a —4E charge on capacitor 94 diode 86 will be forward biased allowing the charge to be transferred to capacitor 98. Capacitor 98 will then charge to —2E, —2E being developed across capacitor 96. This will result in a voltge of −4E being developed at the junction of diodes 86 and 88 and capacitor 98. On the next voltage reversal terminal 74 will again become negative with a voltage of −2E with respect to ground. Terminal 74 will be in series with −2E charge on capacitor 96 and the −2E charge on capacitor 98 so that a voltage of −6E appears at the junction of diodes 86 and 88 and capacitor 98. Diode 88 will be forward biased by this −6E charge allowing capacitor 95 to charge to −2E, capacitor 94 having a −4E charge thereacross. When the voltage across the secondary again reverses, terminal 74 will become positive to be grounded through diode 78 and terminal 76 will be negative recharging capacitor 90 to −E. This will cause the voltage at the junection of diodes 82 and 84 and capactors 96 and 98 to decrease to −2E, and the voltage at the junction of diodes 86 and 88 and capacitors 98 and 99 to decrease to −4E; however, the charges on capacitors 94 and 94 will remain −4E and −2E respectively because diodes 84 and 88 are reverse biased. With a −4E charge on capacitor 94 and −2E charge on capacitor 95 diode 87 is forward biased allowing the charge to be transferred to capacitor 99. Capacitor 99 will then charge to −2E, −2E being developed across capacitors 96 and 98 respectively. On the next voltage reversal terminal 74 will be in series with the −2E charges on each of capacitors 96, 98 and 99 so that a voltage of −8E appears at the junction of diodes 87 and 89 and capacitor 99. Diode 89 will be forward biased by this −8E cahrge allowing the series combination of capacitors 100 and 101 to charge to −8E. On the next voltage reversal terminal 74 again becomes positive and will be grounded through diode 78. With terminal 76 negative capacitor 90 will again recharge to −E. Capacitors 96 and 98 and 99 aprear in series via the grounding of terminal 74 so that the voltage at the junction of diodes 87 and 89 reduces to −6E. Diode 89 is reverse biased under these conditions preventing the discharge of capacitors 100 and 101 into capacitors 99, 98 and 96. This results in a voltage of −8E being maintained across capacitors 100 and 101 and at conductor 104. In the preferred embodiment the voltage induced across the secondary is approximately one thousand volts so that approximately eight thousand volts is developed at conductor 104. Approximately eight thousand volts is the compliance voltage desired in order to provide the necessry corona voltage and current and in order to obtain a more stable operation and regulation. Capacitors 100 and 101, in addition to being able to store the charge for the period of a cycle, also act as a filter attenuating any undesired pulses at conductor 104. The multiplying circuit 66 then is a voltage octupler developing the necessary corona output voltage for power supply circuit 10.

It should be noted that multiplying circuit 66 has no connection to battery 13. The entire charge voltage is developed from the voltage induced in transformer 68 so that no additional current or power is derived from battery 13 other than that used to operate pulse-shaping circuit 48 and oscillating circuit 24. In both of these circuits the power comsumption and current drain is minimized as previously noted.

Six series connected resistors 106 through 111 are connected in parallel with capacitors 100 and 101 and between conductor 104 and terminal 102. Resistors 106–111 are bleeder resistors which act to stabilize the power supply. Conductor 112, connecting the junction of capacitors 100 and 101 to the junction of resistors 108 and 109 acts to equalize the voltage developed across each of capacitors 100 and 101.

A peak current limiting resistor 113 and a load 114 are series connected from conductor 104 to ground potential. Resistor 113 prevents excessive, destructive current from being coupled to load 114. Load 114 represents the resistance of the corona electrode that is positioned adjacent the electrophotographic film to which the corona discharge from the corona electrode is to be coupled. The large corona voltage coupled to the load 114 produces an ionization of air at the surface of the film which is necesary for charging the surface thereof in a manner described in the previously-mentioned copending applications.

Should load 114 be disconnected the voltage multiplying circuit 66 and the high energy magnetic field in transformer 68 can cause the voltage at terminal 70 to rise to a voltage which would damage or destroy transistors 52 and 54. To protect against this occurrence, zener diode 62 is provided to limit the voltage developed across the collector-emitter junction of transistors 54 to under the breakdown voltage of transistor 54. For example, if the breakdown voltage of transistor 54 is 50 volts, zener diode 62 will be chosen to be a VR 47A type zener which has a breakdown voltage of approximately 47 volts.

Power supply 10 is designed to utilize a minimum amount of current. This objective is achieved by sensing the corona current delivered by conductor 104 and inhibiting further operation of pulse shaping circuit 48. Oscillating circuit 24 draws only a very small amount of current from battery 13, even when operating continuously whereas pulse shaping circuit 48, when operated draws substantially all of the current utilized by power supply 10 so that when pulse shaping circuit 48 is inhibited power supply 10 draws substantially no current from battery 13. The desired corona voltage is quite high and fluctuates with changes in the load making it difficult to sense. Consequently, the corona current is sensed by measuring the current available at the multiplier output and inhibiting passage of the oscillation from oscillation circuit 24 to pulse shaping circuit 48 when the available current exceeds a predetermined amount. This output current sensing and feedback control to minimize current drain in power supply 10 is termed current regulation. The function is performed by control circuit 40.

Referring to control circuit 40 a current sensing potentiometer 120 and maximum current or padding resistor 122 are series connected between common return terminal 102 in voltage multiplying circuit 66 and ground potential. A capacitor 124 and zener diode 126 are connected in parallel with one another and in parallel with the series combination of potentiometer 120 and resistor 122 to prevent destruction of the integrated circuit components employed in control circuit 40 if an arc-over condition should occur at the load 114. The moving arm of wiper 128 of potentiometer 120 is connected through resistor 130 to both inputs of NAND 132. Capacitor 134 and diode 136 are connected in parallel between the inputs of gate 132 and ground potential, and diode 138 is connected between the inputs of gate 132 and power source 12. Diodes 136 and 138 are over voltage protection diodes which operate to fix the voltage at the input of gate 132 thus preventing the voltage from falling too far below or rising too far above ground potential and damaging gate 132.

One terminal of a resistor 140 is connected to the inputs of gate 132 and the other terminal is connected to wiper arm 142 of potentiometer 144. One terminal of potentiometer 144 is left unconnected and the other terminal is connected to the output of gate 132. The output of gate 132 is connected to the second input of NAND gate 38. As noted previously, the first input of gate 38 receives oscillations from ocsillating circuit 24.

In operation, potentiometer 120 and resistor 122 are in the current path formed between the output of multiplying circuit 66 and ground potential so that the current passing through potentiometer 120 and resistor 122 is proportioned to the corona current passing through the load. Because the current path through potentiometer 120 and resistor 122 is from terminal 102 to ground potential, the voltage across potentiometer 120 and at wiper arm 128 is positive with respect to ground potential. As the current passing through potentiometer 120 increases, indicating an increase in corona current from conductor 104, the voltage at arm 128 increases. This voltage is coupled through resistor 130 to the inputs of gate 132, and, when voltage exceeds the threshold voltage of gate 132 it causes the output of gate 132 to change from a high state to a low state signal. As the corona voltage and current decreases, the voltage coupled to the inputs of gate 132 will decrease. When this voltage falls below the threshold of gate 132, the output of gate 132 will change from a low state to a high state signal.

Potentiometer 144, resistor 140 and capacitor 134 add a feedback characteristic to the operation of gate 132 so that together they operate with more uniform control. Specifically, as the voltage at the input of gate 132 increases and the output attempts to switch to a low state, the voltage feed back to capacitor 134 will reduce the voltage at the input of gate 132 and prevent a rapid change of the output from a high to low state. As the input voltage decreases and the output attempts to switch to a high state, the voltage fed back to capacitor 134 will increase the voltage at the input of gate 132 and prevent a rapid change in the output from a low to a high state.

When a low state signal, indicative of corona voltage which is adequate for power supply operation is developed at the output of gate 132 and coupled to the second input of gate 38, gate 38 will be inhibited so that no oscillations are coupled to pulse shaping circuit 48. Consequently, when a sufficient corona voltage is developed, the control circuit 40 will operate to minimize the power consumption of power supply 10. If the voltage developed across capacitors 100 and 101 bleeds off and falls below a desired level, or when power supply 10 is initially activated and has not yet developed the desired corona current control, circuit 40 operates to couple oscillations to pulse shaping circuit 48 so that the desired corona current can be developed and maintained. The feedback characteristic of gate 132 noted above causes gate 38 to couple a number of cycles of pulses to pulse shaping circuit 48 for maintaining the desired corona voltage rather than allowing the passage of a single pulse for such maintenance. With this feedback characteristic a stable sensing and control condition is achieved whereas if single pulses were coupled from gate 38 due to the absence of feedback, the corona voltage would oscillate above and below the desired voltage at a more rapid rate due to more frequent operation of the control circuit for shorter periods of time, resulting in an operational characteristic that is more unstable, more difficult to control and less efficient.

It should be noted that various alternations and modifications are considered as being within the scope of this invention. For example, in application Ser. No. 532,713 a similar power supply was shown and described for use in a small, hand held device. The circuit described therein includes a switching circuit and timing circuit employed to activate oscillating circuit 24 for a predetermined period only. In the embodiment shown here, switching circuit 14 may be deleted and replaced by the switching circuit and timing circuit shown in the noted patent. With this circuit addition control circuit 40 will first operate to reduce power consumption to the amount necessary to develop the desired corona voltage, then the timing circuit will terminate the operation of oscillating circuit 24 at the end of a fixed time period, thus terminating all power consumption. The time period of the timing circuit is of course sufficient to utilize power supply 10.

What is desired to be secured by Letters Patent of the United States is:

1. A portable power supply for producing a high corona output when coupled to a D.C. power source including in combination:
    oscillator means operative to develop first oscillations;
    control means coupled to said oscillator means and operative to develop second oscillations in response to said first oscillations and a corona signal indicating a corona output below a predetermined level;
    pulse-shaper means coupled to said control means and operative to develop a first voltage pulse having one polarity in response to a first half of each cycle of said second oscillations and to develop a second voltage pulse having the opposite polarity in response to the second half of each cycle of said second oscillations, said pulse-shaper means being operative to draw substantially all operating current during said first half of each cycle of said second oscillations and substantially no operating current during the second half of each cycle of said second oscillations;
    multiplier means coupled to said pulse-shaper means and operative only in response to said first and second voltage pulses coupled thereto to develop said corona output;
    means for coupling said corona signal from said multiplier means to said control means.

2. The power supply of claim 1 wherein said oscillator means is an astable multivibrator.

3. The power supply of claim 1 wherein said control means include, detector means coupled to said means for coupling said corona signal from said multiplier means and operative to develop a detection signal in response to said corona signal being below said predetermined level, and gate means coupled to said detector means and said oscillator means and operative to develop said second oscillations in response to said first oscillations and said detection signal.

4. The power supply of claim 3 wherein said gate means is a NAND GATE.

5. The power supply of claim 3 wherein said detector means include, sensing means for developing a sensing voltage which varies in accordance with said corona signal, and second gate means coupled to said sensing means and operative to develop said detection signal when said sensing voltage is below a predetermined level.

6. The power supply of claim 5 wherein said second gate means include a NAND gate.

7. The power supply of claim 5 wherein said sensing means include, resistance means for sensing a current proportional to said corona signal and for developing said sensing voltage which varies in accordance with said current, said second gate means operative in response to said sensing voltage being above a threshold, indicating presence of a desired corona output, to terminate said detection signal and operative in response to a sensing voltage below said threshold, indicating a corona signal below the desired corona output to develop said detection signal.

8. The power supply of claim 7 wherein said second gate means include a semiconductor gate and circuit means coupled to said gate and operative to producing a feedback characteristic in the operation of said gate.

9. The power supply of claim 8 wherein said semiconductor gate is a NAND gate having at least one input and an output and said circuit means include resistance means coupled from said output to said input and capacitance means coupled from said input to ground potential.

10. The power supply of claim 1 wherein said multiplier means is a voltage octupler.

11. The power supply of claim 1 wherein said pulse-shaper means include, switch means coupled to said control means and transformer means coupled to said switch means, said switch means operative in response to said first half of each cycle of second oscillations to turn on drawing operating current therethrough and saturation current therethrough and through said transformer means, said switch means operative in response to each second half cycle of said second oscillations to turn off drawing substantially no current and terminating said saturation current therethrough and through said transformer means, said transformer means responsive to said saturation current to develop a first voltage pulse and responsive to said saturation current termination to develop a second voltage pulse.

12. The power supply of claim 11 wherein said transformer means include a transformer having primary and secondary windings, said primary winding being coupled in series between said power source and said switch means, said first and second voltage pulses being developed across section secondary winding.

13. The power supply of claim 12 wherein said transformer saturates in respnse to said saturation current and induces said first voltage pulse across said secondary, said transformer inducing said second voltage pulse across said secondary winding in response to termination of said saturation current.

14. The power supply of claim 11 wherein said switch means include, a first semiconductor means coupled to said control means, said first semiconductor means being normally nonconductive and being operative only in response to said first half of each cycle of said second oscillations to conduct, second semiconductor means coupled to said first semiconductor means and said transformer means and operative only in response to conduction of said first semiconductor means to draw said saturation current therethrough and through said transformer means.

15. The power supply of claim 14 wherein said transformer means include a transformer having a primary and secondary winding, said primary winding being coupled in series between said second semiconductor means and said power source, said first and second voltage pulses being developed across said secondary winding.

16. The power supply of claim 15 wherein said transformer saturates in response to said saturation current and induces said first voltage pulse across said secondary, said transformer inducing the second voltage pulse across said secondary winding in response to termination of said saturation current.

17. The power supply of claim 14 wherein said first semiconductor means include a first transistor and said second semiconductor means include second and third transistors with the second transistor arranged as an emitter follower.

18. The power supply of claim 17 wherein said second semiconductor means include voltage protection means coupled across said third transistor for protecting same from excessive voltage.

19. The power supply of claim 1 wherein said corona output is a corona voltage and said corona signal is a corona current which varies in accordance with corona voltage and wherein said control means include, detector means coupled to said means for coupling said corona signal from said multiplier means and operative to develop a detection signal in response to said corona current being below said predetermined level, and gate means coupled to said detector means and said oscillator means and operative to develop said second oscillations in response to said first oscillations and said detection signal.

20. The power supply of claim 19 wherein said detector means include, sensing means for developing a sensing voltage which varies in accordance with said corona current and second gate means coupled to said sensing means and operative to develop said detection signal when said sensing voltage is below a predetermined level.

21. The power supply of claim 20 wherein said sensing means include, resistance means for developing said sensing voltage which varies in accordance with said corona current, said second gate means operative in response to said sensing voltage being above a threshold, indicating presence of a desired corona current, to terminate said detection signal and operative in response to a sensing voltage below said threshod, indicating a corona current below the desired corona current to develop said detection signal.

22. A portable power supply for producing a high corona voltage including in combination:
input means connectable to a source of D.C. voltage for receiving operating current and voltage therefrom;
oscillator means coupled to said input means and operative to develop oscillations in response to connection to said source of D.C. voltage;
pulse-shaper means coupled to said oscillator means and said input means and operative to develop a first voltage pulse having one polarity in response to a first half of each cycle of said oscillations and to develop a second voltage pulse having the opposite polarity in response to the second half of each cycle of said oscillations, said pulse-shaper means being operative to draw substantially all operating current during said first half of each cycle of said oscillations and substantially no operating current during the second half of each cycle of said oscillations;

multiplier means coupled to said pulse-shaper means and operative only in response to said first and second voltage pulses coupled thereto to develop said corona voltage, said corona voltage reaching a particular amplitude in response to said pulses; and control means coupled between said oscillator means and said pulse shaper means and coupled to said multiplier means, said control means operative in response to a corona voltage below said particular amplitude to couple said oscillations from said oscillator means to said pulse-shaper means and operative in response to a corona voltage above said particular amplitude to inhibit passage of said oscillations from said oscillator means to said pulse-shaper means.

23. The power supply of claim 22 wherein a corona load current varies in accordance with said corona voltage and wherein said control means include, detector means coupled to said multiplier means and operative in response to said corona load current being less than a predetermined current to develop a detection signal, and gate means coupled to said detector means and said oscillator means and operative in response to said detection signal to couple said oscillations from said oscillator means to said pulse-shaper means and operative in response to the absence of said detection signal to inhibit passage of said oscillations from said oscillator means to said pulse-shaper means.

24. The power sypply of claim 23 wherein said detector means include sensing means for developing a sensing voltage which varies in accordance with said corona current and gate means coupled to said sensing means and operative to develop said detection signal when said sensing voltage is below a predetermined level.

25. The power supply of claim 24 wherein said pulse-shaper means include, switch means coupled to said control means and transformer means coupled to said switch means, said switch means operative in response to said first half of each cycle of oscillations to turn on drawing operating current therethrough and saturation current therethrough and through said transformer means, said switch means operative in response to each second half cycle of oscillations to turn off drawing substantially no operating current and terminating said saturation current therethrough and through said transformer means, said transformer means response to said saturation current to develop a first voltage pulse and operative in response to said saturation current termination to develop a second voltage pulse.

* * * * *

UNITED STATES PATENT AND TRADEMARK OFFICE
CERTIFICATE OF CORRECTION

PATENT NO. : 4,028,596
DATED : June 7, 1977
INVENTOR(S) : HAROLD J. WEBER

It is certified that error appears in the above-identified patent and that said Letters Patent are hereby corrected as shown below:

Col. 3, line 32, before "will" omit "and"; Col. 3, line 33, change "The" to --This--; Col. 4, line 3, change "of" to --to--; Col. 5, line 6, change "or" to --of--; Col. 6, line 8, change "off" to --of--; Col. 7, line 2, change "voltge" to --voltage--; Col. 7, line 30, change "cahrge" to --charge--; Col. 8, line 59, change "of" to --or--; Col. 11, line 50, change "respnse" to --response--; Col. 12, line 46, change "threshod" to --threshold--

Signed and Sealed this

Twentieth Day of September 1977

[SEAL]

Attest:

RUTH C. MASON
Attesting Officer

LUTRELLE F. PARKER
Acting Commissioner of Patents and Trademarks